United States Patent [19]

Fokos

[11] 4,439,173
[45] Mar. 27, 1984

[54] REPLACEABLE LAGGING FOR DRUM-TYPE PULLEYS

[76] Inventor: Peter Fokos, 1624 E. Redfield Dr., Tempe, Ariz. 85283

[21] Appl. No.: 331,525

[22] Filed: Dec. 17, 1981

[51] Int. Cl.³ .................... F16H 55/48; F16H 55/36
[52] U.S. Cl. ................................. 474/191; 474/185
[58] Field of Search .................. 474/185–192; 29/129.5, 130, 131, 159 R, 145.4 D, 446, 450, 463

[56] References Cited

U.S. PATENT DOCUMENTS

| 1,889,374 | 10/1932 | Renck | 29/130 |
| 2,256,193 | 9/1941 | Coss | 29/129.5 |
| 2,739,018 | 3/1956 | Collett | 29/130 |
| 3,010,332 | 11/1961 | Skates | 474/191 |
| 3,354,735 | 11/1967 | Holz | 474/191 |
| 4,233,853 | 11/1980 | Holz | 474/185 |

FOREIGN PATENT DOCUMENTS 57381  1/1953  France ........................ 29/463

Primary Examiner—Price C. Faw, Jr.
Assistant Examiner—Andrew J. Rudy
Attorney, Agent, or Firm—Gregory J. Nelson

[57] ABSTRACT

A lagging face for a drum-type pulley comprising a plurality of separate segments having an inner rigid shell conforming to the surface of the pulley. A facing is bonded to the outer surface of the shell and the shell is welded to the drum. The shell overhangs the edges of the pulley to provide surface for welding and is selected having a diameter and an inner arcuate dimension slightly less than that of the drum to which it is to be applied to insure a tight fit. Another aspect of the present invention provides a method for truing a crown drum comprising placing truing rings over the existing drum prior to relagging.

5 Claims, 11 Drawing Figures

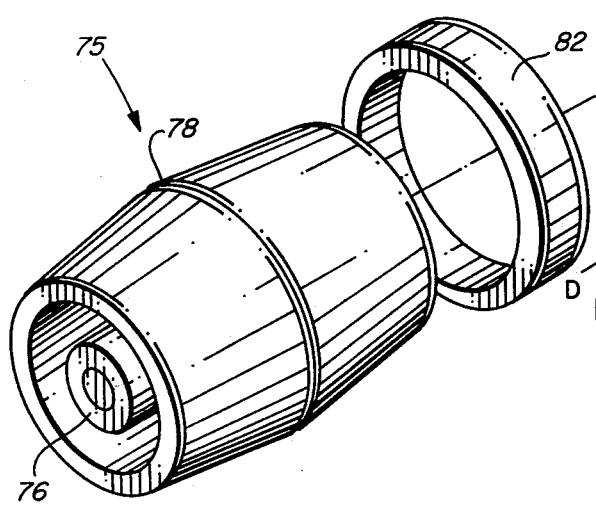
FIG._6A
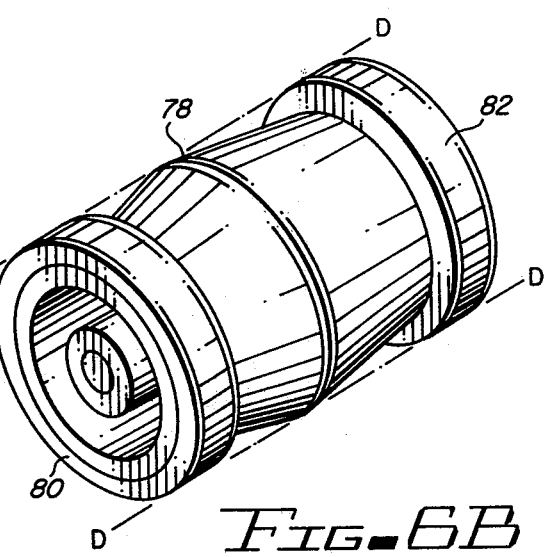
FIG._6B
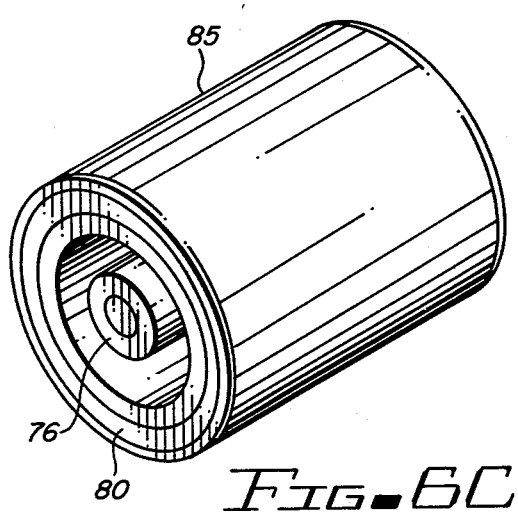
FIG._6C
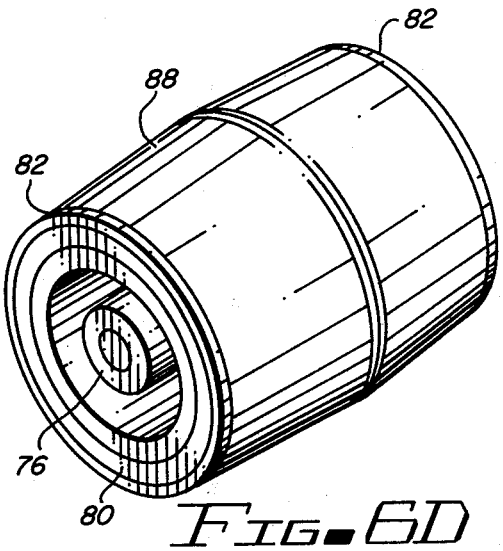
FIG._6D
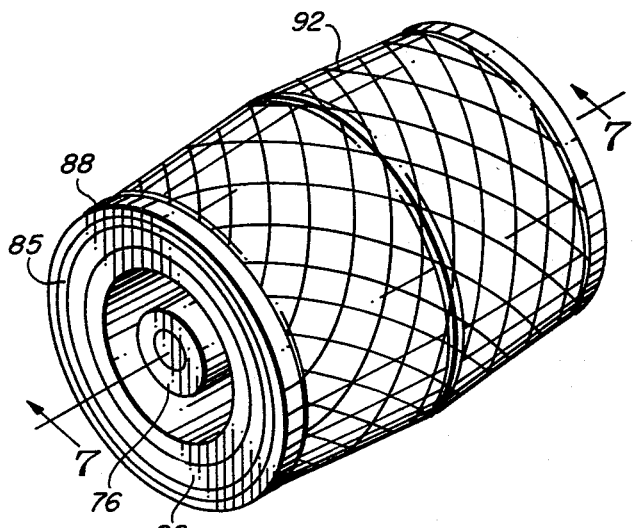
FIG._6E
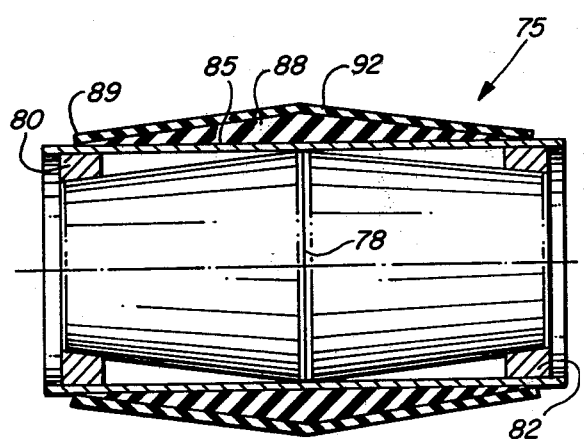
FIG._7

REPLACEABLE LAGGING FOR DRUM-TYPE PULLEYS

The present invention relates to belt pulleys and more particularly relates to a replaceable lagging for improving friction between a pulley and the engaging belt.

Wide faced or drum-type pulleys are employed in various industries and applications to drive endless belts such as conveyor belts. Generally, pulleys are smooth-faced so the engaging belt is subject to substantial slippage particularly under heavy loads.

Accordingly, to meet the problem of slippage, it has been a practice in the industry to provide the pulley with a friction or traction facing, termed a "lagging", of rubber or other material, to increase the frictional characteristics of the pulley. One manner of attachment of the lagging has been to vulcanize a continuous traction face of rubber directly on the exterior metal surface of the pulley. The pulley constructed in this manner provides improved friction, minimizing slippage between the drum and belt. The disadvantage of this method is that when the lagging becomes worn, the entire pulley must be removed and replaced with a new unit. To accomplish this, the worn pulley is generally sent to a remote plant for reworking and application of a new lagging face. The new lagging face is conventionally bonded or vulcanized to the metal face of the pulley. This procedure involves considerable expenditure of labor and time in removing the existing pulley and replacing with a new one. Further, handling and shipping costs of transporting the pulley to a remote location can be substantial.

Accordingly, it has been suggested in the prior art to provide segments for use in forming the driving surface of an endless belt conveyor driving pulley. The segments consist of several arcuate metal plates with rubber or a rubber-like facing bonded at the outer surface. The arcuate plates are secured to the outer surface of the pulley drum by pins or bolts which are generally flush mounted. Thus, when the lagging becomes worn, the individual segments can be removed in situ and replaced without the necessity of having to replace the entire pulley. This provides substantial advantages in that it is not necessary to remove the entire pulley particularly in constricted locations as within mine tunnels and shafts or closely adjacent to other equipment. This manner of lagging pulleys also avoids necessity of having to return an entire pulley to a remote plant location for reworking. Reference is made to U.S. Pat. No. 3,010,332 representative of this type of lagging.

While pulley traction face arrangements consisting of individual lagging segments has been well-accepted, some difficulty has been encountered in achieving proper fit of the segment on the surface of the pulley. The segmented traction faces available in the prior art often require a substantial number of bolts and pins which are difficult and time-consuming to remove and to replace. Segmented removable traction faces are shown in various prior art patents particularly U.S. Pat. Nos. 4,233,853 and 3,354,735.

Accordingly, there exists a need in the prior art for an improved pulley-engaging lagging section or segment which can be efficiently and effectively and positively applied to the outer surface of a pulley drum when the laggings become worn. Therefore, it is an object of the present invention to provide an improved, replaceable pulley lagging or segment which may be easily and conveniently replaced, when necessary. An additional object of the present invention is to provide a lagging segment for drum-type pulleys which can be used in connection with a crowned or flat-faced pulley.

Briefly, the present invention provides a replaceable lagging consisting of a plurality of individual pulley-engaging segments having an arcuate steel shell segments conforming generally to the curvature of the pulley drum about which it is to be placed. The outer facing of rubber or other rubber-like material is vulcanized or otherwise bonded to the outer surface of the steel shell segment. In the preferred embodiment, the inner shell is provided in two hemi-spherical segments with the major inner diameter of each segment being slightly less than the outer diameter of the pulley to insure tight fit. The segments are welded in place on the drum. The present invention also comprehends a method for truing the relagging crowned drums.

The above and other objects and advantages of the present invention will be more fully appreciated from the following description, claims and drawings in which:

FIGS. 6A through 6E illustrate the sequential steps in the method of truing and relagging a crowned pulley; and FIG. 7 is a longitudinal cross-sectional view illustrating a completed crown pulley according to the present invention.

Turning now to the drawings, the improved or lagging of the present invention is applied to the outer surface of pulley 10 which consists of central hub 12 and cylindrical drum 14 having a smooth, outer surface 15. The pulley 10 may be in the form of the common type of pulley such as is employed in various industries to drive heavy duty endless conveyor belts and other belts or may be other types of pulleys or rolls for processing, feeding and other specialized applications.

Figure 1:
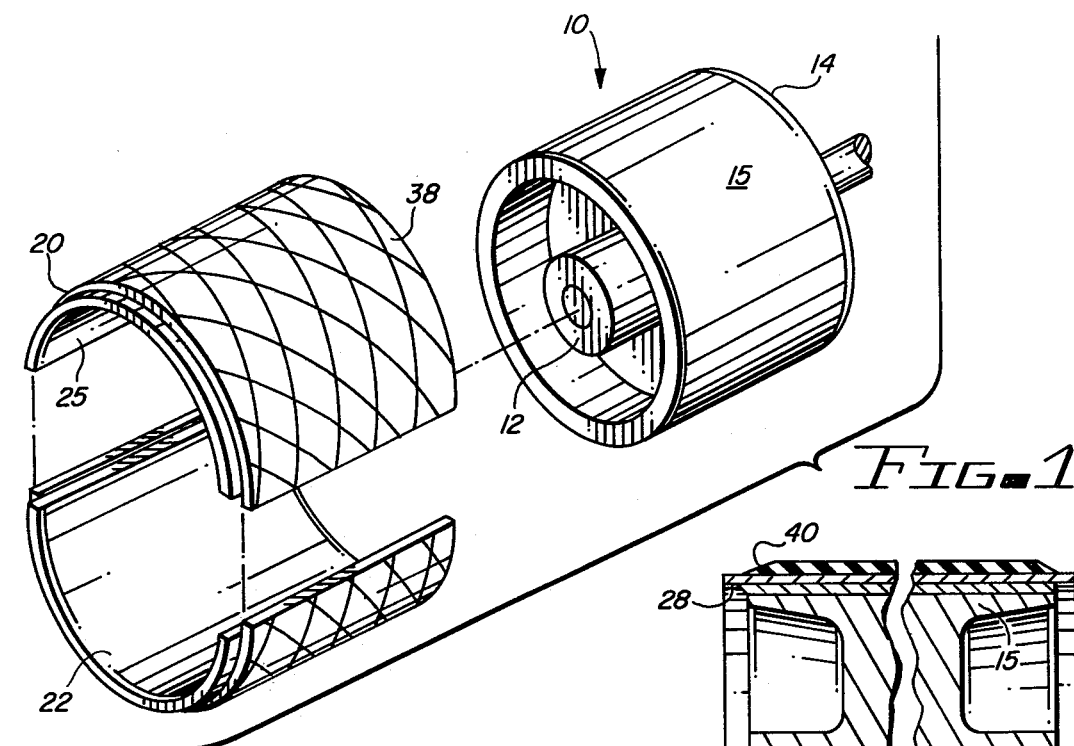
FIG. 1 is an exploded perspective view of a pulley and replaceable lagging of the present invention.
Figure 2:
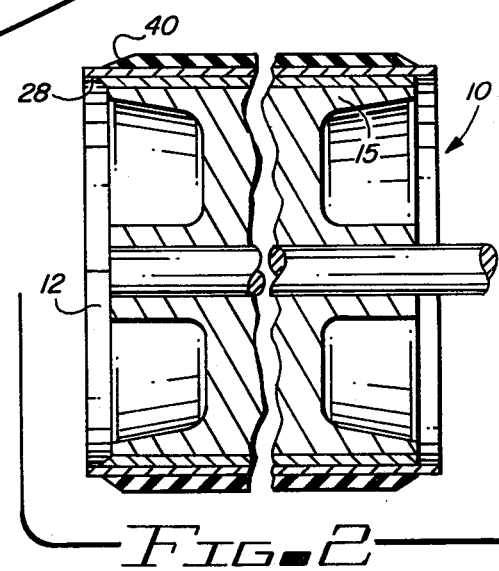
FIG. 2 is a longitudinal cross-sectional view of a pulley provided with the lagging of the present invention.

The lagging of the present invention consists of a plurality of separate segments 20 and 22. The sections 20 and 22 are generally constructed identical one to the other so a description of section 20 will be sufficient. Section 20 consists of an inner shell segment 25 being generally arcuate. Typically, inner shell 25 is fabricated from hot rolled steel. As best shown in FIG. 2, the longitudinal dimension of segment 25 exceeds the corresponding dimension of the drum 14 to which the segment is to be applied. Preferably an overhang, typically about one-half inch as indicated by the numeral 28, is provided at both ends of the drum. The purpose of the overhang 28 is to provide adequate area for securement of the shell segment 25 to the drum by welding without damaging the exterior facing of the lagging material. Welding may be continuously applied or tacked about the circular overhang 28.

Figure 3:
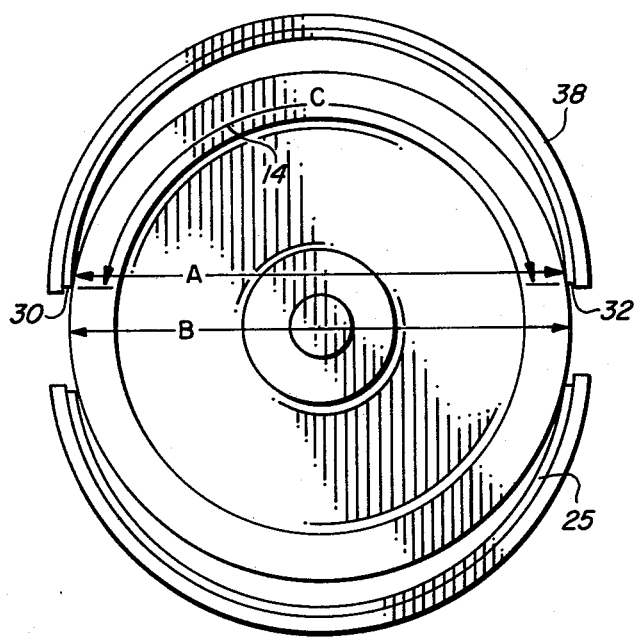
FIG. 3 is an end view showing the lagging segment positioned adjacent the pulley.

As is best seen in FIG. 3, the shell segment 25 is selected having a diameter as indicated by the letter A, slightly less than the corresponding diameter B of the drum to which the lagging is to be placed. Typically, dimension A is undersized between ⅛" and ¼" for conventional pulleys having an outer diameter of 30" to 40". Thus, when the shell segment 20 is applied to the outer surface of the drum, the shell must be forced over the drum. Edges 30 and 32 are spread so that the shell tightly engages the outer surface of the drum.

A facing 35 is bonded, as by vulcanizing, to the exterior surface of each of the shell segments 20 and 22. The facing preferably is of a suitable abrasion resistant material such as rubber or other elastomeric material. In some cases the lagging may even by a soft metal such as lead or aluminum. In order to improve the frictional characteristics, the exterior surface of the lagging may be provided with grooves 38 which are shown in a criss-cross pattern. Grooves in other geometric patterns may also be provided in facing 35. Typical patterns are diamond and herringbone. As best seen in FIG. 2, the facing is tapered at each edge 40 and terminates inwardly at the edge of the underlying shell segment 20.

Figure 5:
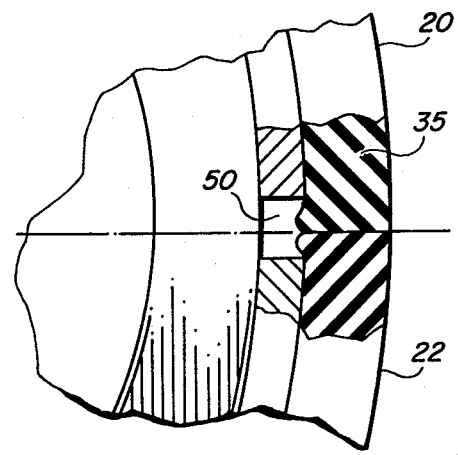
FIG. 5 is a detail view as indicated in FIG. 4.
Figure 4:
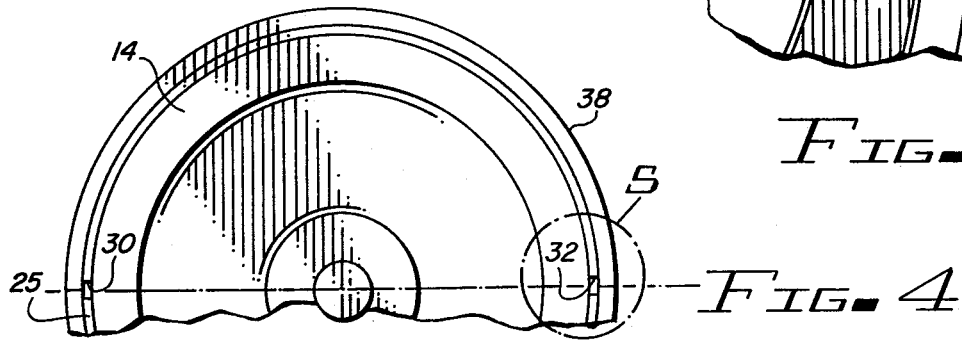
FIG. 4 is a partial view similar to FIG. 3 with the lagging segments in place on the pulley.

As best seen in FIGS. 3 and 5, the inner arcuate dimension C, measured along the inner circumference of the shell segment, is selected so that a slight gap or space 50 exists between the edges of the adjoining laggings. The facing 35 extends circumferentially beyond the terminus of the shell segment so that the facings 35 tightly abut one another. The clearance 50 allows for some adjustment in placing the lagging on the outer surface of the drum and insures that no "bump" occurs on the lagging surface as excess facing material is accomodated in gap 50.

It is noted that FIGS. 1 through 5 illustrate traction face composed of two segments. It will be obvious that any desired number of segments can be selected depending upon the application and size of drum. Further, the facing is shown as being of uniform thickness. A crown lagging which increases in thickness from either edge of the lagging toward the center of the lagging may also be constructed in the manner described above.

FIGS. 6 and 7 illustrate the method of truing and relagging crown-type pulleys as mentioned above, have a greater mid-diameter than edge diameter. Crown-type pulleys are used in some applications for better belt retention. In FIGS. 6 and 7, a crown pulley 75 is shown having central hub 76. The outer surface of the drum 75 is crowned, tapering to an apex 78 at the axial or longitudinal midpoint of the drum 75. In a relagging operation, the old lagging has been first been removed from the drum 75 due to the stress placed on the drum during operations. Accordingly, when the drum is relagged some truing may also be necessary. This is accomplished by rebuilding the drum 75 as shown in FIGS. 6A to 6E. The existing drum 75 is first trued by placing annular truing rings 80 and 82 over either the ends of drums. The rings 80 and 82 are positioned longitudinally so the surfaces of the truing rings 80 and 82 align with the apex or crown 78 as represented by lines D—D in FIG. 6B. Each of the rings 80, 82 can be moved longitudinally along the drum taper until the desired alignment occurs.

Once this is accomplished, as seen in FIG. 6C, an outer cylindrical shell 85 can be wrapped about the drum and truing rings and welded in place at the edges. With the truing rings properly positioned and welded to the drum, the shell 85 should define a precise cylinder. Shell 85 typically is hot rolled sheet metal.

The next step in the relagging process is shown in 6D and involves the placement of a preformed crowned envelope 88 about the shell 85. The envelope 88 is crowned in the middle and tapers longitudinally in either direction terminating slightly inward of the edge of shell 85. The envelope may be secured to the shell 85 by vulcanization or any suitable bonding procedure. The taper should be uniform to the centerpoint of the pulley and the amount of crown can be selected as required by the application.

The final step in the relagging process is shown in FIG. 6E. The outer facing 92 is positioned over the crown. The outer facing 92 consists of a layer of resilient material such as rubber or elastomeric of uniform thickness. The opposite edges of the facing may be slightly tapered at 89 as shown. The thickness can be selected consistent with the particular application. The facing may be applied in any conventional manner by bonding or vulcanization. As best seen in FIG. 6E, the outer lagging is preferably provided with grooves 92 to improve the frictional characteristics of the lagging. FIG. 7 illustrates the re-lagged drum in cross-section.

Thus, the present invention provides an improved pulley lagging which can be installed in-place on pulleys in a minimum time. The lagging provided herein provides an efficient, reliable and economical installation.

It will be obvious to those skilled in the art to make various changes, alterations and modifications to the invention described herein. To the extent that these changer, alterations and modifications do not depart from the spirit and scope of the appended claims, they are intended to be encompassed therein.

I claim:

1. A replaceable lagging section for a drum-type pulley of the type having a continuous cylindrical outer surface, said lagging section comprising an arcuate shell being a segment of a cylinder having an arcuate inner surface generally conforming to the exterior of said drum, an outer surface, opposite lateral ends and opposite longitudinal edges, said shell in an unstressed condition having a chord dimension measured on a straight line between the opposite longitudinal edges of said shell less than a corresponding dimension of the drum to which the shell is to be applied, said shell further having a facing material applied to the outer surface of said shell whereby said shell may be tightly engageable about said drum by expanding the longitudinal edges and tack welded in place at selected locations at said shell in substantially abutting relationship with other similar sections to provide a substantially continuous facing around said pulley.

2. The lagging section of claim 1 wherein the dimension of the longitudinal edges exceed the width of the pulley to which it is to be applied thereby providing an overhanging lip for welding the section to the drum.

3. The section of claim 2 wherein said facing comprises a rubber material and wherein said facing terminates inwardly of the opposite lateral edges of said shell.

4. The section of claim 1 wherein the arcuate distance along the inner curvature of said shell is less than the corresponding distance along the outer surface of the drum to which the shell is to be applied whereby a space exists between adjoining shell segments when applied and further wherein the said facing extends circumferentially beyond the edge of the associated shell whereby adjacent facings extend across the said space between adjacent shells.

5. The section of face claim 1 further including grooves in the surface of the said facing to improve the frictional characteristics thereof.

* * * * *